W. N. Whiteley
Harvester Rake.
No. 79,170.  Patented June 23, 1868.
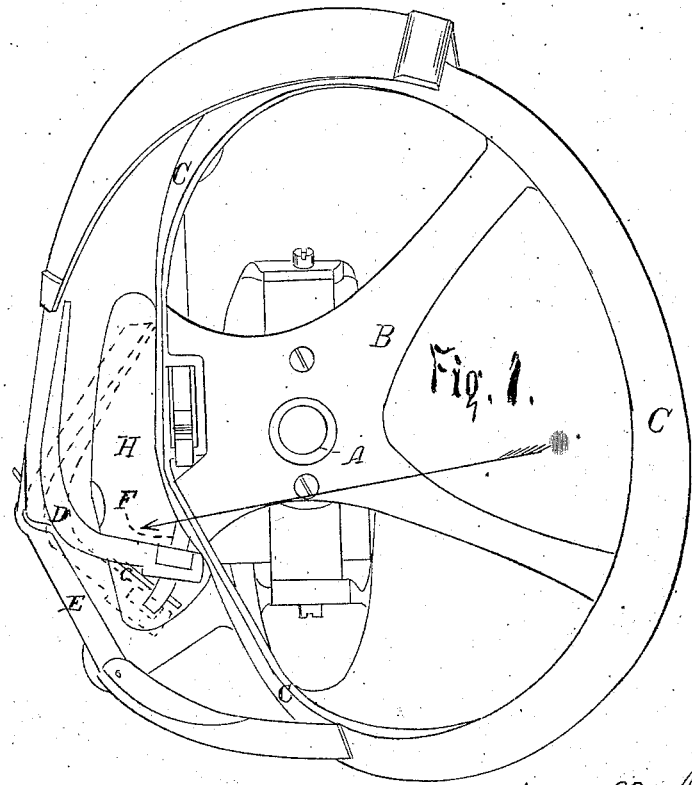
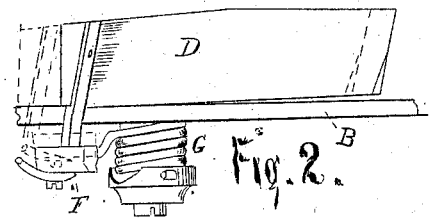
W. N. Whiteley
By his atty
R. D. O. Smith
451 7th St.
Witnesses
R. S. Turner
Wm. F. Browne

UNITED STATES PATENT OFFICE.

WILLIAM N. WHITELEY, OF SPRINGFIELD, OHIO.

IMPROVEMENT IN HARVESTER-RAKES.

Specification forming part of Letters Patent No. 79,170, dated June 23, 1868.

*To all whom it may concern:*

Be it known that I, WILLIAM N. WHITELEY, of Springfield, in the county of Clarke and State of Ohio, have invented a new and useful Improvement in Reel and Rake Guides; and I do hereby declare the following to be a full, clear, and exact description of the same, reference being had to the accompanying drawings, in which—

Figure 1 is a plan view of the frame of my rake-guard. Fig. 2 is a side elevation of the switch and its attachments, looking in the direction of the arrow in Fig. 1.

This invention relates to that class of reels and rakes which have independent arms jointed to a revolving shaft-head, and guided in their revolution by a stationary camway or guide, so arranged with a switch or gate that, except when said switch is opened, the rake or reel arms will pass above the platform at such a distance that the cut grain will not be removed therefrom; and it consists in constructing the said guide-frame with an opening, so that no clogging matter can accumulate to impede said switch in its operation.

That others may understand my invention, I will particularly describe it.

A is a hollow post or standard through which the reel and rake shaft passes and has its bearings. At the top of the post A is firmly secured the frame B, upon the outer edge of which is the camway or guide C, so formed that, as the traveler of each rake or reel arm passes over it, the fan or blade attached to said arm will be guided in the desired path, and this path will be, when toward the cutting apparatus and platform, in a plane parallel thereto, and at such a distance therefrom that the cut grain will be swept off and deposited upon the ground.

To make this apparatus fully efficient it is desirable that either of the reel-blades should, when required, act as a rake, and as this is ordinarily not required oftener than once during each revolution of the shaft, it follows that one only of the reel-blades should ordinarily be permitted to follow the guide C entirely around the circuit, and the remaining arms should, during that part of their revolution which is over the cutting apparatus and platform, pass over a supplemental guide, or in some other way be caused to pass so far above the platform as to avoid removing the cut grass therefrom. This is accomplished by using a switch similar to D, which, when closed, as shown, causes the traveler-rollers of the rake and reel arms to diverge from the main guideway and pass over the supplemental guideway E.

The switch D may be opened automatically, at stated periods, by the revolution of a lug or other device, operated by the revolving reel-shaft, and it may be also under the control of the driver or attendant, so that when the grain is more than usually thick it may be removed from the platform oftener than once for each revolution of the reel-shaft.

When the switch D is closed it is caught and retained in that position by the latch F until, either by the automatic action of the machine or by the volition of the driver, the latch F is withdrawn, and the switch liberated.

A spring, G, causes the switch to open whenever it is liberated from the latch F.

It has been found that this switch, as heretofore constructed, will frequently become so clogged with dirt and dust as to be very slow and unreliable in its operation. The spring G will fail to throw it open at the proper time, or will move it a part way only, and the result is an utter derangement of the operation of the rake, or a violent stoppage of the machine, with a fracture of some of the moving parts.

To avoid this difficulty, I cut the bed of the frame B almost entirely away beneath the switch D, making the orifice H, through which all the dirt and clogging matter will drop away from the switch, so that its proper operation can never be impeded in that way.

I do not wish to be understood as limiting myself to the particular description of switch as shown in my drawings, for there are others for the same purpose in use, which are liable to the same difficulties, and which will be relieved by the same means—*i. e.*, removal of that part of the frame over which the switch passes, so that clogging matter cannot find lodgment to impede the switch in its operation.

Having described my invention, what I claim as new is—

A guide-frame, B, constructed with an orifice, H, over which the switch D, or its equivalent, must move in opening and closing, substantially as and for the purpose set forth.

W. N. WHITELEY.

Witnesses:
THOMAS J. PRINGLE,
CHAS. ANTHONY.